United States Patent Office 2,868,041
Patented Jan. 13, 1959

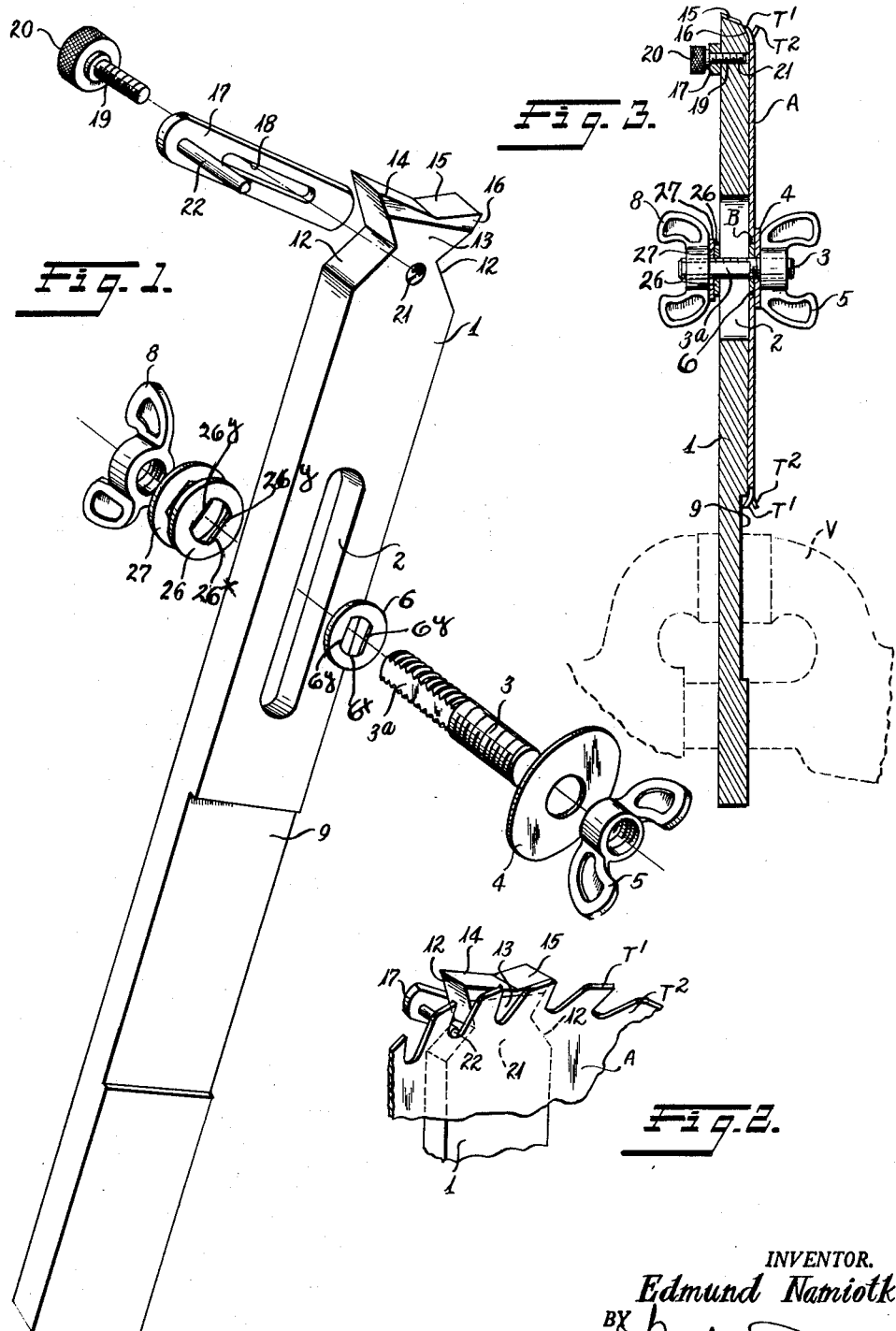

2,868,041

CIRCULAR SAW FILER

Edmund Namiotka, Johnson City, N. Y.

Application July 16, 1956, Serial No. 598,201

5 Claims. (Cl. 76—31)

This invention is a novel improvement in circular saw filers, and the principal object thereof is to provide a device to which a circular saw may be readily attached, the device being held in a vise or the like and serving as a guide for a reciprocable file used to sharpen the teeth of the saw, and having means thereon for positioning or indexing the guide to conform with the desired spacing of the teeth, the outer end of the guide lying opposite the tooth and being case hardened so as to maintain its shape notwithstanding the filing action, thereby insuring that all of the saw teeth will be sharpened at the same angle, and will be sharpened at the same true radius from the center of the saw on a perfect circle during the sharpening operation.

Other objects of the invention are to provide a device of the above character adapted to hold saws of different diameters; also to provide a device in which the spacing means on the device may be adjusted to suit different spacings of the teeth of the circular saw.

Other minor objects of the invention will be hereinafter set forth.

I will explain the invention with reference to the accompanying drawing which illustrates one practical embodiment thereof to enable others familiar with the art to adopt and use the same, and will summarize in the claims the novel features of construction, and novel combinations of parts, for which protection is desired.

In said drawings:

Figure 1 is an expanded perspective view of my novel circular saw filer.

Fig. 2 is an enlarged view of the outer end of the guide portion of the device showing the parts in position with respect to a tooth preparatory to the filing operation.

Fig. 3 is a reduced vertical section through the device holding a circular saw and supported in a vise shown in dotted lines; also showing the device in position for the filing operation.

As shown, the circular saw A to be sharpened is provided with alternating divergent teeth T1 and T2 around its periphery of any desired configuration, and is provided with a central hole B in the customary manner.

The filing device consists of a substantially rectangular bar 1 of greater length than the diameter of the circular saw A, the device being normally supported in a vise V as shown in dotted lines in Fig. 3.

Extending longitudinally of the bar 1 adjacent its outer end is a slot 2 adapted to register with the central opening B of the saw A; and a threaded stud member 3 extends through the slot 2 and circular hole B receiving washers and wing nuts to securely clamp the circular saw to the bar 1. As shown, a plain washer 4 of relatively large size is provided around the stud member 3 at the saw end of member 3; and a thumb nut 5 is threaded onto the stud member 3 to engage the washer 4 to hold the circular saw A to the bar 1. A portion of threaded stud member 3 is flattened on opposite sides as at 3a to slidably engage the sides of slot 2 and to prevent the threaded stud member 3 from rotating in slot 2 as wing nut 5 is rotated on member 3.

On the same end of stud member 3 as the washer 4 and thumb nut 5, is a washer 6 which may be of various diameters, same having a central bore 6x adapted to receive the stud 3, said bore having opposed parallel straight side walls 6y slidably engaging the flattened portions 3a of stud member 3, the washer 6 being limited on stud member 3 towards thumb nut 5 by contact of the portions 6y thereof with the shoulders formed at the inner ends of the flattened portions 3a of the stud member 3.

On the other end of the stud member 3 are a pair of washers 26 and 27 which are engaged by a thumb nut 8 wereby saw A may be tightly clamped to bar 1, but upon loosening either thumb nut 5 or 8 the saw A may be shifted on bar 1 towards or from the outer end thereof.

Washer 26 is similar in all respects to washer 6, same having a bore 26x provided with parallel straight diametrically disposed sides 26y slidably engaging the flattened portions 3a of stud member 3.

Washer 27 which may be of various diameters is also similar to washers 6 and 26, the washers 6, 26 and 27 being adapted to slide on stud 3. The design and arrangement of the washers 6, 26 and 27 provides that when the thumb nut 8 is tightened, the washer 6 is prevented from becoming loosened, thus facilitating the rotation of saw A during the filing operation. Washer 4 is preferably twice the size of washer 27, and washers 6, 26 and 27 are precision spacers which locate the center of the saw A on the stud member 3.

In order to provide clearance for divergent teeth T1 and T2 of saw A, a recess or groove 9 is provided in the face of bar 1 adjacent saw A to receive the same, thus providing for use of saws of large or small diameters with respect to bar 1, as clearly indicated in Fig. 3.

The outer end of bar 1 is provided with opposed V-shaped notches 12 in its sides forming a substantially V-shaped outer head 13 which may be case-hardened, or not, to withstand abrasive action of the reciprocable file used to sharpen teeth T1—T2, respectively, and the outer end of the head 13 is shaped with surfaces such as 14 and 15 to serve as a guide for the said file (not shown). Preferably the side face of head 13 adjacent the surfaces 14—15 is beveled as at 16 to provide for passage therepast of the divergent teeth T1—T2 to prevent the sides of the teeth from contacting the head 13. The particular conformation of the faces 14—15 would obviously be such as to conform with the actual shape of the teeth T1—Ta or the portions thereof adjacent their cutting ends so that when bar 1 has been positioned as shown in Fig. 3, for the filing operation, the file would be laid across the guide surface 14 or 15 opposite the teeth T1 or T2, and the file then reciprocated in the usual manner to file the outer edge portion of the tooth to proper cutting angularity.

In order to properly index or position circular saw A on bar 1 when filing each individual tooth T1 or T2, an indexing detent is provided as shown, same consisting of a bar 17 adjacent the head 13 having an axial slot 18 extending longitudinally thereof for the passage of a screw 19 having a knurled head 20, the screw passing through said slot and into a tapped bore 21 in bar 1 below head 13, the slot 18 permitting the bar 17 to be shifted laterally with respect to head 13.

Adjacent one end of the bar 17 is an indexing bar 22 adapted as shown in Fig. 2 to seat in the bosom of the next adjacent tooth T1 and T2 so that the head 13 will be properly indexed and will form a filing guide for the tooth to be filed, said indexing detent preventing annular shifting of the bar 1 with respect to the saw A during the filing operation, particularly when pressure is being applied to the file while being reciprocated on the surface 14 or 15 of bar 1, the use of the indexing detent thus insuring that each tooth of the circular saw will be filed at the same angle and at the same angularity as the corresponding portions of adjacent teeth.

My device may therefore be used for filing circular saws of various diameters, the saws having variously designed teeth, as obviously the head 13 and the guide surfaces 14—15 are preformed to suit the particular saw which is to be sharpened, the head 13 being case-hardened to prevent wear and deformation of the surfaces 14—15.

I do not limit my invention to the exact form shown in the drawing, for obviously changes may be made therein within the scope of the claims.

I claim:

1. A circular saw file guiding device comprising a bar of substantially rectangular cross-section adapted to be mounted adjacent one end on a support, said bar having adjacent its other end an axial slot; a member extending through said slot adapted to extend through the central hole of a circular saw; means on said member for frictionally clamping said saw to said bar; a head at the outer end of said bar, the outer end of said head being adapted to be aligned with the outer edge of a tooth of said saw and adapted to guide a reciprocable file engaging the outer end of said tooth means for positioning the teeth of said saw with respect to said head; said member being threaded at each end, and having flattened portions diametrically opposed and engaging the side walls of said slot; and said clamping means comprising washers on said member engaging the outer faces of said saw and bar respectively; and wing nuts on the ends of said member engaging said washers respectively.

2. A circular saw file guiding device comprising a bar of substantially rectangular cross-section adapted to be mounted adjacent one end on a support, said bar having adjacent its other end an axial slot; a member extending through said slot adapted to extend through the central hole of a circular saw; means on said member for frictionally clamping said saw to said bar; said bar having a transverse groove in its end adjacent said support adapted to receive the teeth of saws of various diameters; the outer end of said bar having opposed V-shaped notches adjacent its outer end forming a substantially V-shaped head, the outer end of which head is adapted to be aligned with the outer edge of a tooth of said saw and adapted to guide a reciprocable file when engaging the outer end of said tooth; and means for positioning the teeth of said saw with respect to said head.

3. In a device as set forth in claim 2, said member being threaded at each end, and having flattened portions diametrically opposed and engaging the side walls of said slot; and said clamping means comprising washers on said member engaging the outer faces of said saw and bar respectively; and wing nuts on the ends of said member engaging said washers respectively.

4. In a device as set forth in claim 2, the outer end of said head being beveled to receive the teeth of said saw.

5. In a device as set forth in claim 2, said positioning means comprising a member pivoted on said head, means for adjusting said member transversely of said head; and a pin on said member adapted to seat in the bosom of the next adjacent tooth when the head is aligned with the outer edge of a tooth to be filed.

References Cited in the file of this patent

UNITED STATES PATENTS

| | | |
|---|---|---|
| 584,860 | Dowble | June 22, 1897 |
| 603,536 | Neidhardt | May 3, 1898 |
| 2,420,468 | De Walt | May 13, 1947 |
| 2,429,292 | Ouellet | Oct. 21, 1947 |
| 2,436,002 | Hall | Feb. 17, 1948 |
| 2,459,233 | Mall | Jan. 18, 1949 |
| 2,545,607 | Dixon | Mar. 20, 1951 |
| 2,605,654 | Holmes | Aug. 5, 1952 |
| 2,634,631 | Mathes | Apr. 14, 1953 |
| 2,768,450 | Pearce | Oct. 30, 1956 |
| 2,770,152 | Davis | Nov. 13, 1956 |